(12) United States Patent
Otani (10) Patent No.: US 10,981,344 B2
(45) Date of Patent: Apr. 20, 2021

(54) TIRE VULCANIZING METHOD AND TIRE VULCANIZING APPARATUS

(71) Applicant: Sumitomo Rubber Industries, Ltd., Hyogo (JP)

(72) Inventor: Koji Otani, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 16/823,965

(22) Filed: Mar. 19, 2020

(65) Prior Publication Data
US 2020/0316888 A1 Oct. 8, 2020

(30) Foreign Application Priority Data
Apr. 3, 2019 (JP) .............................. JP2019-071442

(51) Int. Cl.
*B29D 30/06* (2006.01)
(52) U.S. Cl.
CPC ..... *B29D 30/0606* (2013.01); *B29D 30/0662* (2013.01); *B29D 30/0603* (2013.01); *B29D 30/0629* (2013.01); *B29D 2030/0675* (2013.01)
(58) Field of Classification Search
CPC ........... B29D 30/0603; B29D 30/0629; B29D 30/0662; B29D 2030/062; B29D 2030/0675
See application file for complete search history.

(56) References Cited

U.S. PATENT DOCUMENTS

| 2,911,670 A | * | 11/1959 | Soderquist | ......... | B29D 30/0603 425/33 |
| 3,640,653 A | * | 2/1972 | Laenen | ............... | B29D 30/0649 425/33 |
| 3,714,321 A | * | 1/1973 | Yoshida | ............. | B29D 30/0603 264/334 |
| 5,127,811 A | * | 7/1992 | Trethowan | ......... | B29D 30/0602 425/32 |
| 2017/0057295 A1 | | 3/2017 | Kageyama et al. | | |

FOREIGN PATENT DOCUMENTS

| EP | 2 133 193 A1 | 12/2009 |
| GB | 1 406 068 A | 9/1975 |
| JP | 2011-073252 A | 4/2011 |
| JP | 2014-231160 A | 12/2014 |
| JP | 2016-055820 A | 4/2016 |

OTHER PUBLICATIONS

The extended European search report issued by the European Patent Office dated Aug. 24, 2020, which corresponds to European Patent Application No. 20163470.6-1014 and is related to U.S. Appl. No. 16/823,965.

* cited by examiner

*Primary Examiner* — James P Mackey
(74) *Attorney, Agent, or Firm* — Studebaker & Brackett PC

(57) ABSTRACT

A tire vulcanizing method includes a tire removal step for removing a vulcanized tire from a mold. The tire removal step includes a stage in which upper and lower side molds are moved inward in a tire axial direction so as to deform the vulcanized tire in a direction in which a bead width of the vulcanized tire is decreased, and a stage in which, in the deformed state of the vulcanized tire, the segments are moved outward in a tire radial direction so that the segments are removed from the vulcanized tire.

20 Claims, 7 Drawing Sheets

TIRE VULCANIZING METHOD AND TIRE VULCANIZING APPARATUS

TECHNICAL FIELD

The present invention relates to a tire vulcanizing method and a tire vulcanizing apparatus capable of shifting a split position between a side mold and a tread mold inwardly in a tire radial direction while enabling removal of a vulcanized tire from a mold.

BACKGROUND ART

For example, Patent Document 1 shown below has described a tire vulcanizing method and a vulcanizing apparatus including a step of removing a vulcanized tire from a mold.

In the vulcanizing apparatus described above, an upper side mold, an upper pressing plate, and an actuator are each fixed to an upper platen plate. Then, in synchronization with the vertical movement of the upper platen plate, the upper side mold, the upper pressing plate, and the actuator move vertically together. Further, a lower side mold and a lower pressing plate are each fixed to a lower platen plate.

On the other hand, in recent years, for tires for four-wheel drive vehicles such as SUVs, in order to improve traction performance in off-the-road, it has been proposed that blocks (hereinafter, may be referred to as side blocks) are also provided in a region, including a buttress portion, positioned outside a sidewall portion in a tire radial direction (see Patent Document 2, for example). As the side blocks, those formed by extending blocks provided on a tread shoulder (hereinafter, may be referred to as shoulder blocks) may be used.

PRIOR ART DOCUMENT

Patent Document

[Patent Document 1]
Japanese Unexamined Patent Application Publication No. 2014-231160
[Patent Document 2]
Japanese Unexamined Patent Application Publication No. 2016-55820

SUMMARY OF THE INVENTION

Problems to be Solved by the Invention

However, when a tire having the side blocks is vulcanized by using the above-described vulcanizing apparatus, a parting line of the mold is generated on surfaces of the side blocks, which causes a problem that the appearance of the tire is impaired. The parting line is a protruding mold mark generated at the split position between the tread mold and a side plate.

As a countermeasure, the present inventor has proposed to use a mold in which the split position is shifted radially inward of the side block. However, in this case, when the mold is opened, a new problem arises in that a segment is caught on the side block and the tire cannot be removed from the mold.

Therefore, an object of the present invention is to provide a tire vulcanizing method and a tire vulcanizing apparatus which can shift the split position between the side mold and the tread mold to an inner side in a tire radial direction while enabling removal of a vulcanized tire from the mold.

Means for Solving the Problems

The present invention is a tire vulcanizing method for vulcanizing a green tire by a mold including a tread mold including a plurality of segments arranged in a tire circumferential direction and upper and lower side molds, including a tire removal step of removing the vulcanized tire from the mold after vulcanization, wherein the tire removal step includes a stage in which each of the upper and the lower side molds is moved inward in a tire axial direction so as to deform the vulcanized tire in a direction in which a bead width of the vulcanized tire is decreased, and a stage in which, in the deformed state of the vulcanized tire, each of the segments is moved outward in a tire radial direction such that the segments are removed from the vulcanized tire.

In the tire vulcanizing method according to the present invention, it is preferred that a distance in the tire radial direction between a bead base line and a split position between the tread mold and the upper and the lower molds is smaller than ½ of a tire section height.

In the tire vulcanizing method according to the present invention, it is preferred that a split position between the tread mold and the upper and the lower molds is positioned radially inside a tire maximum width position.

In the tire vulcanizing method according to the present invention, it is preferred that the tire removal step further includes a stage in which each of the segments is moved outward in the tire radial direction from a closed state of the mold so as to separate the tread mold from the side molds.

The present invention is a tire vulcanizing apparatus used in the above-described tire vulcanizing method including a control unit configured to perform the stage in which each of the upper and the lower side molds is moved inward in the tire axial direction so as to deform the vulcanized tire in the direction in which the bead width is decreased, and the stage in which, in the deformed state of the vulcanized tire, each of the segments is moved outward in the tire radial direction so as to be removed from the vulcanized tire.

In the tire vulcanizing apparatus according to the present invention, it is preferred that an upper plate for supporting the segments, and a first lifting and lowering device capable of moving the upper side mold inward in the tire axial direction with respect to the upper plate. are included.

In the tire vulcanizing apparatus according to the present invention, it is preferred that a first detecting unit which detects a moving distance in the tire axial direction of the upper side mold with respect to the upper plate is further included.

In the tire vulcanizing apparatus according to the present invention, it is preferred that a lower plate for placing the lower side mold, and a second lifting and lowering device capable of moving the lower side mold inward in the tire axial direction with respect to the lower plate are included.

In the tire vulcanizing apparatus according to the present invention, it is preferred that a second detecting unit which detects a moving distance in the tire axial direction of the lower side mold with respect to the lower plate is further included.

In the tire vulcanizing apparatus according to the present invention, it is preferred that a distance in the tire radial direction between a bead base line and a split position between the tread mold and the upper and the lower molds is smaller than ½ of a tire section height.

In the tire vulcanizing apparatus according to the present invention, it is preferred that a split position between the tread mold and the upper and the lower molds is positioned radially inside a tire maximum width position.

Effects of the Invention

In the tire vulcanization method of the present invention, the tire removal step includes the stage in which each of the upper and the lower side molds is moved inward in the tire axial direction so as to deform the vulcanized tire in the direction in which the bead width of the vulcanized tire is decreased.

Thereby, when vulcanizing a tire having side blocks, for example, it is possible that the segments are pulled out radially outward without getting caught on the side blocks, while preventing a parting line from being generated on the surfaces of the side blocks. That is, the vulcanized tire can be removed from the mold while suppressing deterioration of the appearance due to the parting line.

MODE FOR CARRYING OUT THE INVENTION

An embodiment of the present invention will now be described in detail.

Figure 1:
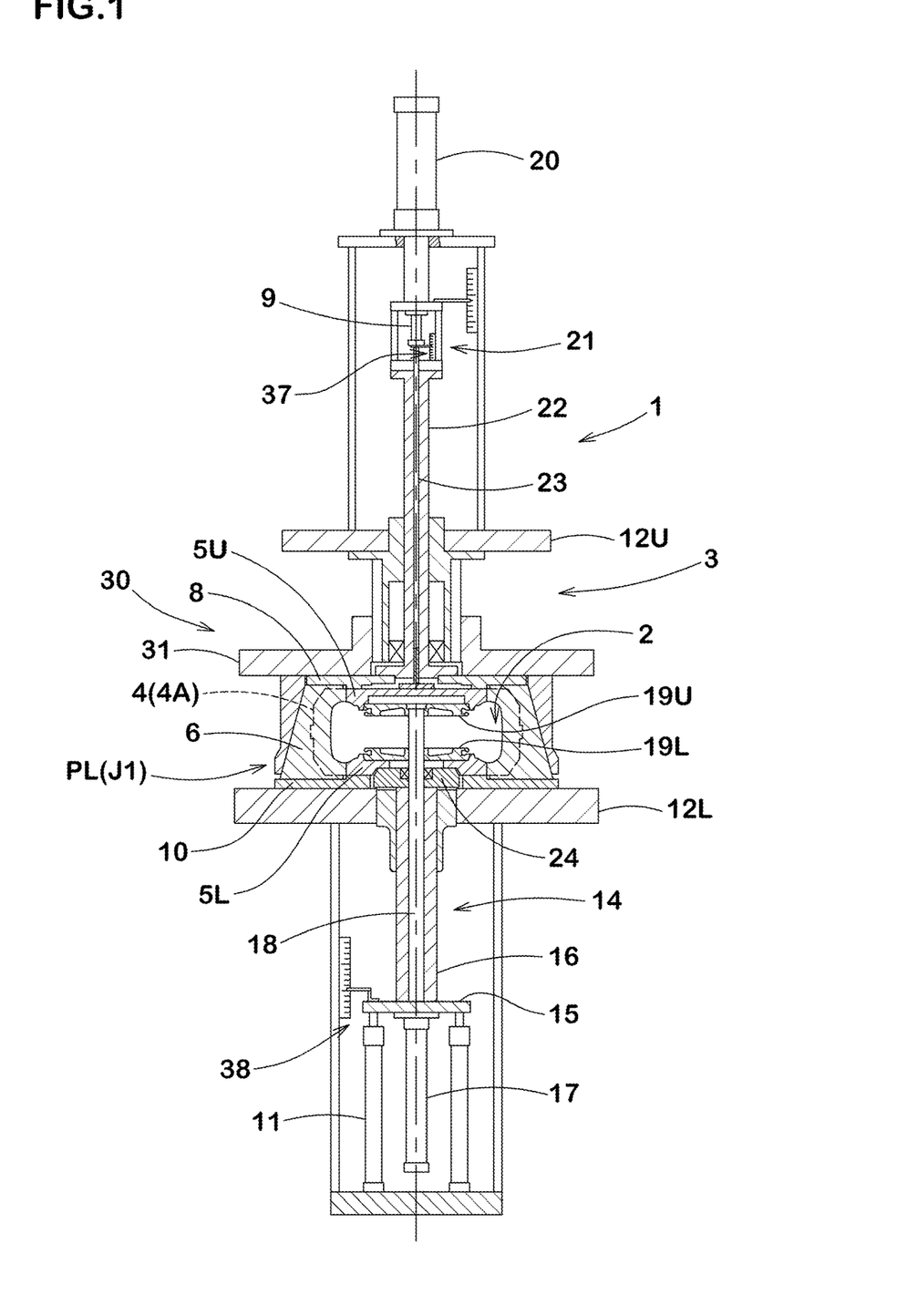
FIG. 1 A side view conceptionally showing an embodiment of a tire vulcanizing apparatus of the present invention.
Figure 7A:
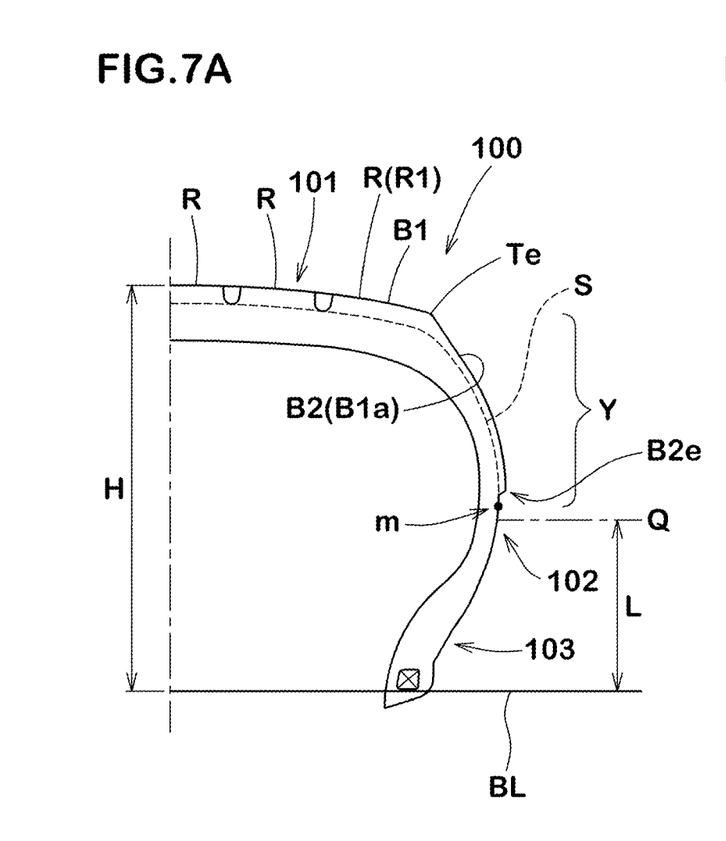
FIG. 7A A cross-sectional view showing a tire formed by the present invention.

FIG. 1 is a side view showing an embodiment of a tire vulcanizing apparatus 1 according to the present invention. FIG. 7A is a cross-sectional view of an embodiment of a vulcanized tire 100 (hereinafter, may be referred to as tire 100) and FIG. 7B is a side view of an embodiment of the tire 100.

Figure 7B:
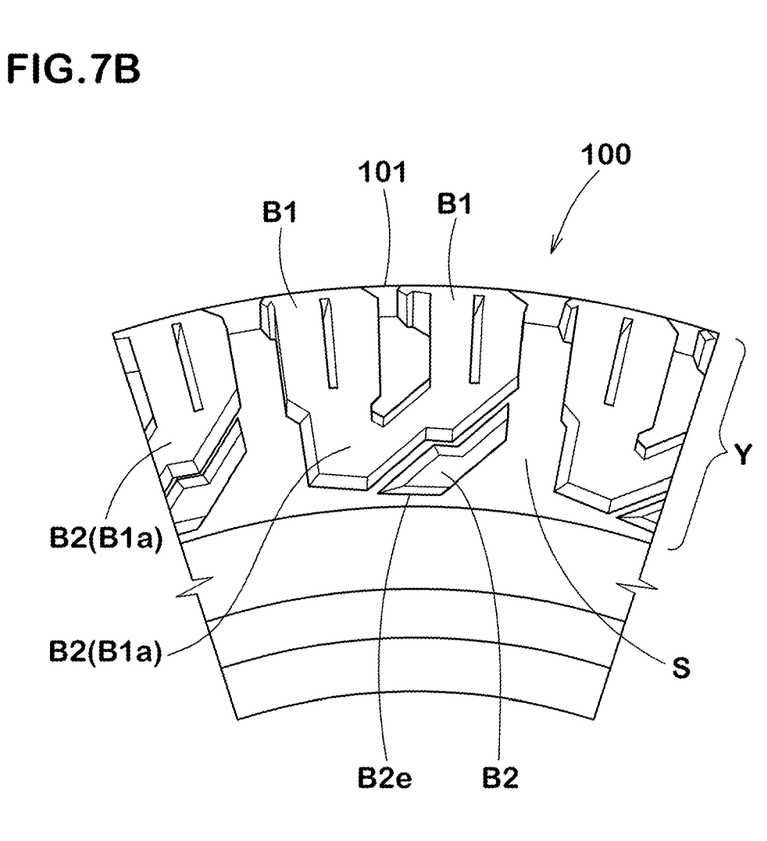
FIG. 7B A partial side view showing the tire formed by the present invention.

As shown in FIGS. 7A and 7B, the tire 100 of the present embodiment is a tire for a four-wheel drive vehicle such as an SUV, and includes a tread portion 101, sidewall portions 102 extending inwardly in a tire radial direction from both outer sides in a tire axial direction of the tread portion 101, and bead portions 103 each arranged at a radially inner end portion of a respective one of the sidewall portions 102. The tire 100) may have a well-known internal structure using a cord reinforcing layer (not shown) such as a carcass, a belt, and a band.

In the tread portion 101, a tread pattern including a plurality of block rows (R) extending in a tire circumferential direction is arranged. The plurality of the block rows (R) includes a shoulder block row (R1) arranged on the outermost side in the tire axial direction. The shoulder block row (R1) is composed of a plurality of shoulder blocks (B1) arranged in the tire circumferential direction.

In the tire 100 of the present example, a side pattern consisting of side blocks (B2) is formed in a radially outer region (Y) of the sidewall portions 102 in order to improve the traction performance in off-the-road. The side blocks (B2) protrude from surfaces (S) of the sidewall portions 102. The side blocks (B2) may be formed as extended portions (B1a) in which the shoulder blocks (B1) extend inward in the tire radial direction beyond tread edges (Te), or may be formed as independent blocks different from the shoulder blocks (B1). Shapes, protrusion heights, and the like of the side blocks (B2) can be appropriately set according to the tire size and the like.

The radially outer region (Y) means a region radially outside a tire maximum width position (m) which is the position where the surface (S) of each of the sidewall portions 102 protrudes outermost in the tire axial direction in the sidewall portions 102.

As shown in FIG. 1, the tire vulcanizing apparatus 1 includes a mold 2 and an apparatus main body 3 which supports the mold 2 so that the mold 2 can be opened and closed.

Figure 2:
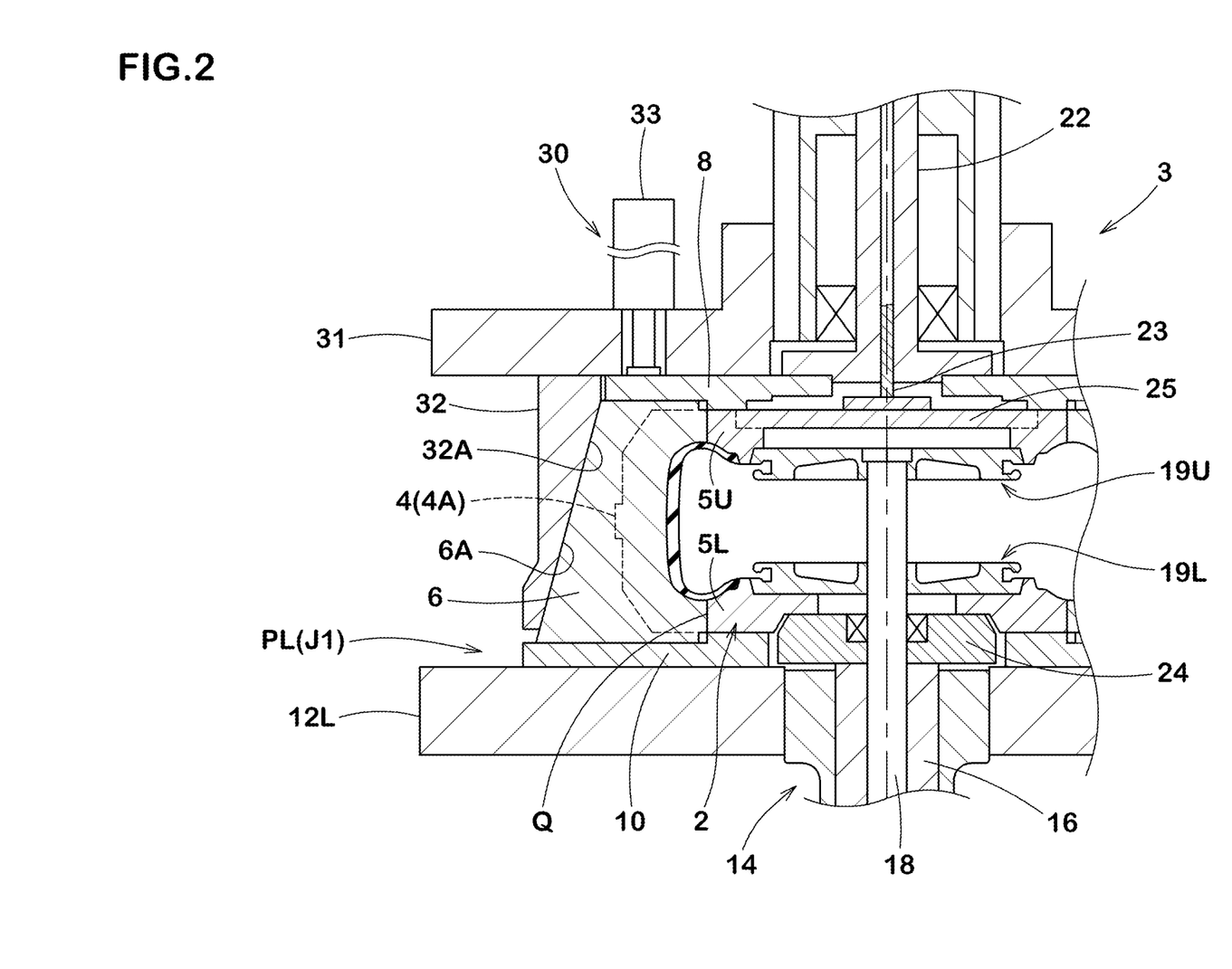
FIG. 2 An enlarged cross-sectional view showing a main part of the tire vulcanizing apparatus.

As shown in FIG. 2, the mold 2 includes an annular tread mold 4 capable of expanding and contracting in the tire radial direction, and upper and lower side molds (5U) and (5L). The tread mold 4 includes a plurality of segments (4A) arranged in the tire circumferential direction and each of the segments (4A) is held in a sector 6 so as to be exchangeable.

The tread mold 4 (segments (4A)) is provided with a molding surface for forming the tread pattern and the side pattern. That is, a split position (Q) between the upper and lower side molds (5U) and (5L) and the tread mold 4 is, as shown in FIG. 7A, positioned at least radially inside an innermost end (B2e) in the tire radial direction of the side blocks (B2).

It is preferred that a distance (L) in the tire radial direction between the split position (Q) and a bead base line (BL) is smaller than ½ of a tire section height (H). It is also preferred that the split position (Q) is positioned radially inside the tire maximum width position (m). The present invention can be most effective for the mold 2 having the split position (Q) configured as such.

Further, each of the upper and lower side molds (5U) and (5L) is provided with a portion positioned radially inside the split position (Q) in each of the sidewall portions 102 and the molding surface for forming the bead portions 103.

As shown in FIGS. 1 and 2, the apparatus main body 3 includes an upper plate 8 for supporting the tread mold 4 (segments (4A)), a first lifting and lowering device 9 capable of moving the upper side mold (5U) axially inwardly relative to the upper plate 8, a lower plate 10 for placing the lower side mold (5L), and a second lifting and lowering device 11 (shown in FIG. 1) capable of moving the lower side mold (5L) axially inwardly relative to the lower plate 10. In the present specification, the side facing a tire equator in the tire axial direction (corresponding to the vertical direction) is defined as "inside".

Specifically, the apparatus main body 3 of the present example further includes upper and lower bases (12U) and (12L) supported by a frame (not shown) or the like, and the lower plate 10 is fixed on the lower base (12L).

Further, a center mechanism 14 including a vulcanizing bladder (not shown) is arranged in the lower base (12L). The center mechanism 14 includes the second lifting and lowering device 11 which is a cylinder, for example, a lifting and lowering plate 15 supported on an upper end of a rod of the second lifting and lowering device, and a cylindrical support cylinder 16 rising from the lifting and lowering plate 15. The lower side mold (5L) is supported on an upper end of the support cylinder 16 with a holder 24 therebetween. The second lifting and lowering device 11 is attached to a bottom plate disposed below the lower base (12L), for example. Therefore, by the extension of the rod of the second lifting and lowering device 11, the lower side mold (5L) can be moved axially inwardly relative to the lower plate 10 via the lifting and lowering plate 15, the support cylinder 16, and the holder 24.

The center mechanism 14 includes a third lifting and lowering device 17 which is a cylinder, for example, supported by the lifting and lowering plate 15, and a center post 18 passing through a center hole of the support cylinder 16 is formed continuously on an upper end of a rod of the third lifting and lowering device. A grip ring (19U) for holding an upper end portion of the vulcanizing bladder is attached to an upper end of the center post 18. Further, on the lower side mold (5L), a grip ring (19L) for holding a lower end portion of the vulcanizing bladder is attached.

Next, on the upper base (12U), a fourth lifting and lowering device 20, which is a cylinder, for example, and supports the upper plate 8 so as to be vertically movable, is arranged.

In the present example, the fourth lifting and lowering device 20 is supported on a top plate that is attached to the upper base (12U) with a space therebetween. A cylindrical support cylinder 22 is formed continuously to a lower end of a rod of the fourth lifting and lowering device 20 via a joint portion 21. The upper plate 8 is fixed to a lower end of the support cylinder 22. Therefore, the upper plate 8 can be moved up and down integrally with the tread mold 4 via the joint portion 21 and the support cylinder 22 by the expansion and contraction of the rod of the fourth lifting and lowering device 20. The tread mold 4 can be moved up and down between a lowered state (PL) (shown in FIGS. 1 to 4) in which a lower surface of the sector 6 is in contact with the lower plate 10 and a standby state (PU) (shown in FIG. 6) in which the sector 6 is separated upward from the lower plate 10.

The joint portion 21 supports the first lifting and lowering device 9 which is a cylinder, for example. A lifting and lowering shaft 23 extending downward through a center hole of the support cylinder 22 is formed continuously to a lower end of a rod of the first lifting and lowering device 9. The upper side mold (5U) is attached to a lower end of the lifting and lowering shaft 23 via a connecting portion 25.

Accordingly, the upper side mold (5U) can be moved axially inside relative to the upper plate 8 by the extension and contraction of the rod of the first lifting and lowering device 9 via the lifting and lowering shaft 23. In the present example, the upper side mold (5U) can be lowered together with the upper plate 8 from the standby state (PU) to the lowered state (PL) by the fourth lifting and lowering device 20. Further, in the lowered state (PL), the upper side mold (5U) can be moved axially inside relative to the upper plate 8 by the extension and contraction of the rod of the first lifting and lowering device 9.

The apparatus main body is further provided with a diameter expanding and contracting unit 30 for expanding and contracting the diameter of the tread mold 4.

Figure 3:
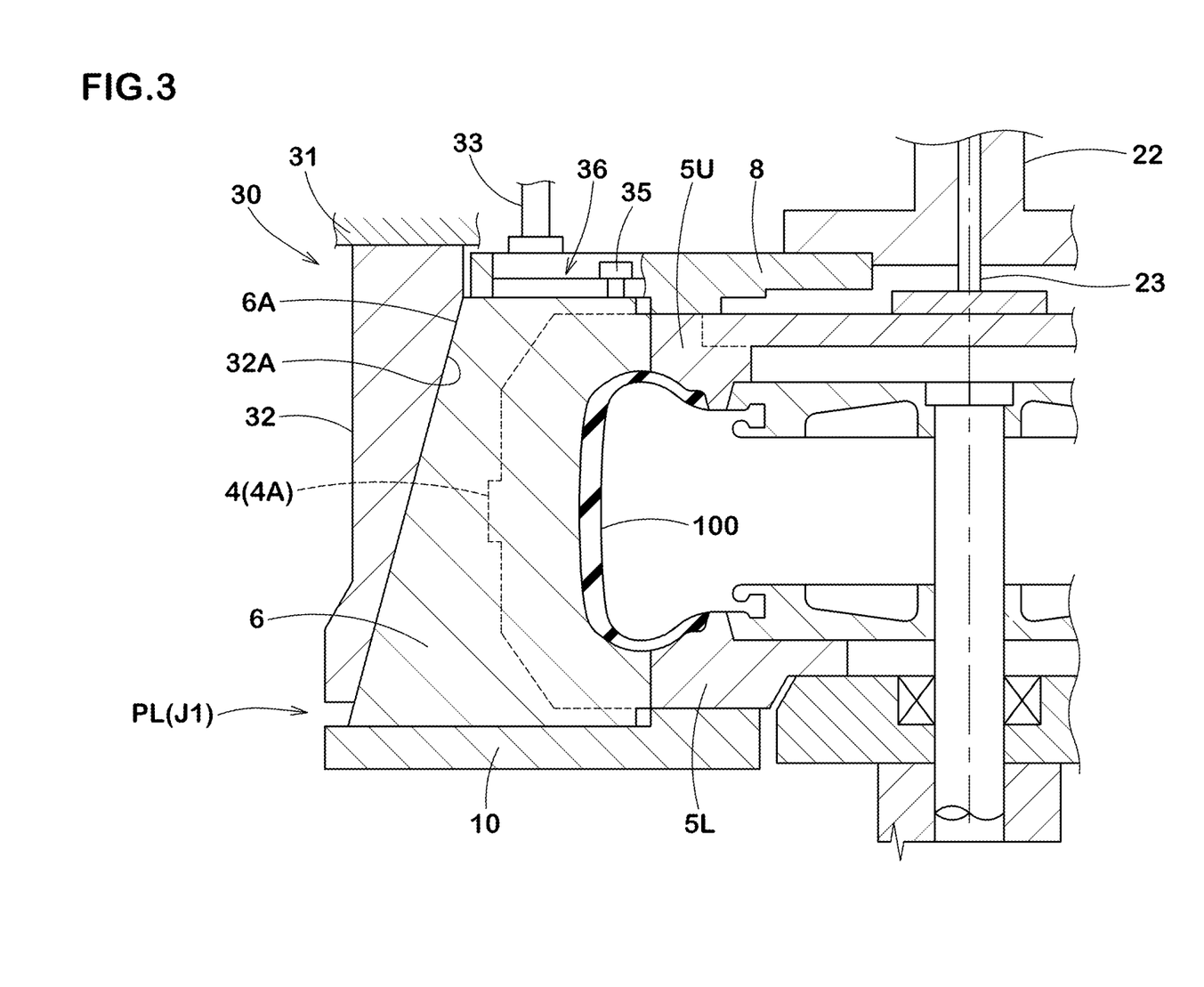
FIG. 3 A cross-sectional view showing molds in a closed state together with a vulcanized tire.

As shown in FIGS. 2 and 3, the diameter expanding and contracting unit 30 includes a lifting and lowering plate 31 and a cylindrical actuator 32 supported by the lifting and lowering plate 31. On an inner peripheral surface of the actuator 32, a guide portion (32A) that is inclined radially outwardly as it goes downward is provided. Further, the lifting and lowering plate 31 is arranged so as to be vertically movable relative to the upper plate 8 by a fifth lifting and lowering device 33 (shown in FIG. 2) which is a cylinder, for example. In FIG. 1, the fifth lifting and lowering device 33 is not shown.

As shown in FIG. 3, the segments (4A) are held by the upper plate 8 so as to be movable in the radial direction by a guide pin 35, which is provided on an upper end of the sector 6, being guided by a guide groove 36 provided in the upper plate 8. Further, a guide portion (6A) having the same inclination as the guide portion (32A) and guided by the guide portion (32A) is provided on a radially outer surface of the sector 6.

Figure 6:
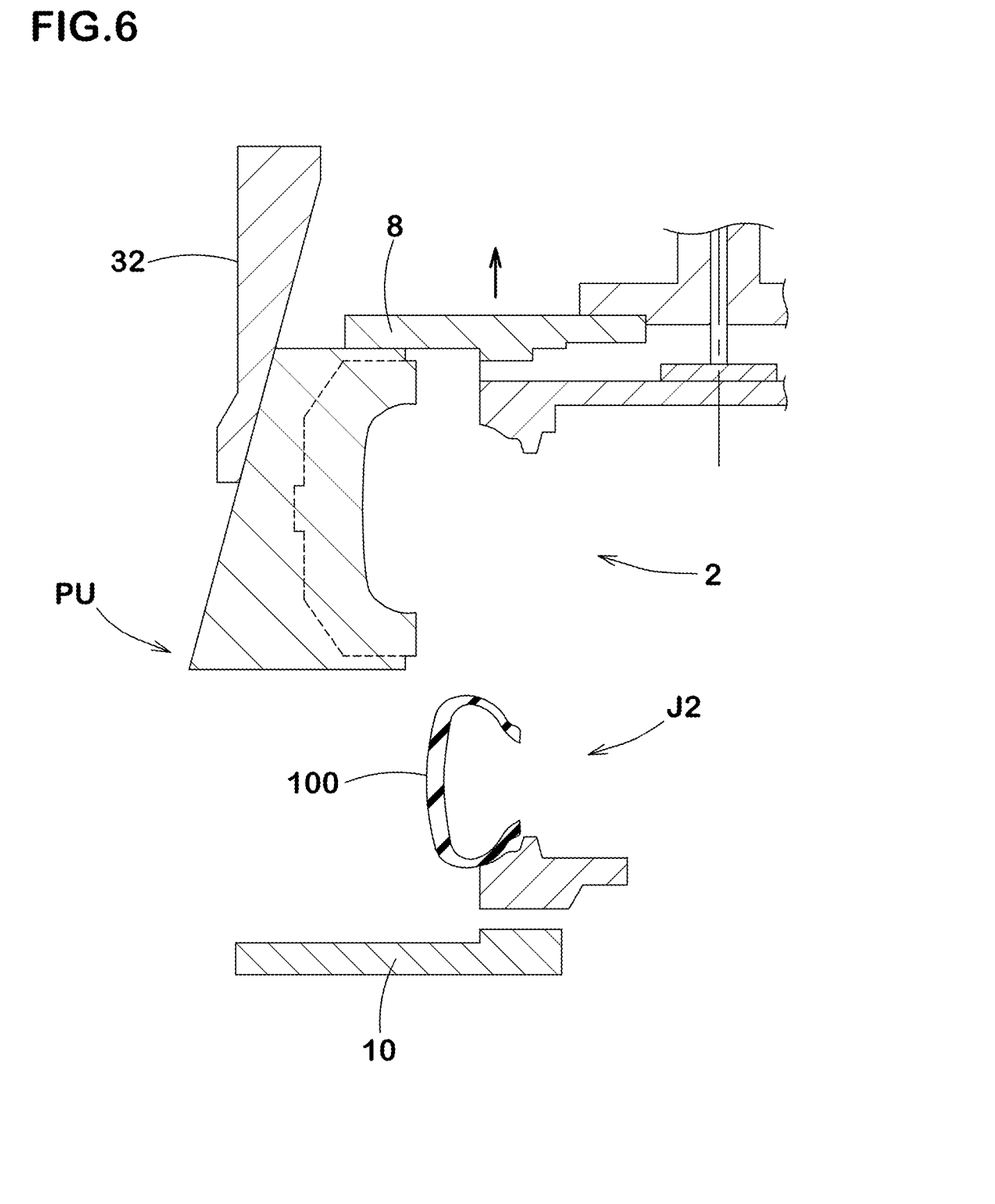
FIG. 6 A conceptional diagram showing the molds in an open state.

Therefore, the actuator 32 can be moved upward relative to the upper plate 8 by the fifth lifting and lowering device 33. Thereby, each of the segments (4A) can be moved radially outwardly, and the tread mold 4 can be expanded in diameter. Further, after the diameter expansion, the upper plate 8 is lifted by the fourth lifting and lowering device 20, so that the tread mold 4 in a diameter expanded state and the upper side mold (5U) can be integrally lifted as shown in FIG. 6, therefore, the tire 100X) can be removed from the mold 2.

Next, a tire vulcanizing method using the tire vulcanizing apparatus 1 will be described. The tire vulcanizing method of the present embodiment includes a step of arranging a green tire in the mold 2 in an open state (not shown), a step of vulcanizing the green tire arranged in the mold 2 in a closed state, and a tire removal step of removing the vulcanized tire 100 from the mold 2 after the vulcanization.

Among these, the step of arranging a green tire and the step of vulcanizing the green tire are the same as the conventional vulcanization method. Therefore, the description thereof will be omitted, and only the tire removal step will be described below.

Figure 5A:
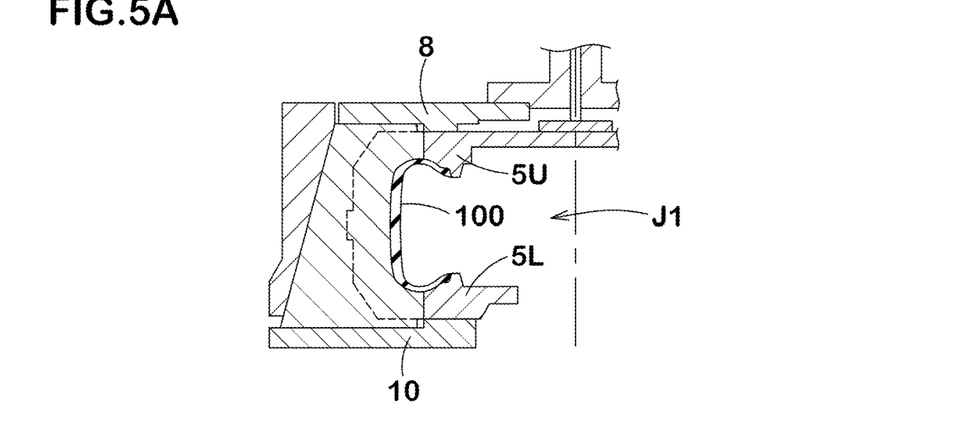
FIG. 5A A conceptional diagram showing a tire removal process.
Figure 5B:
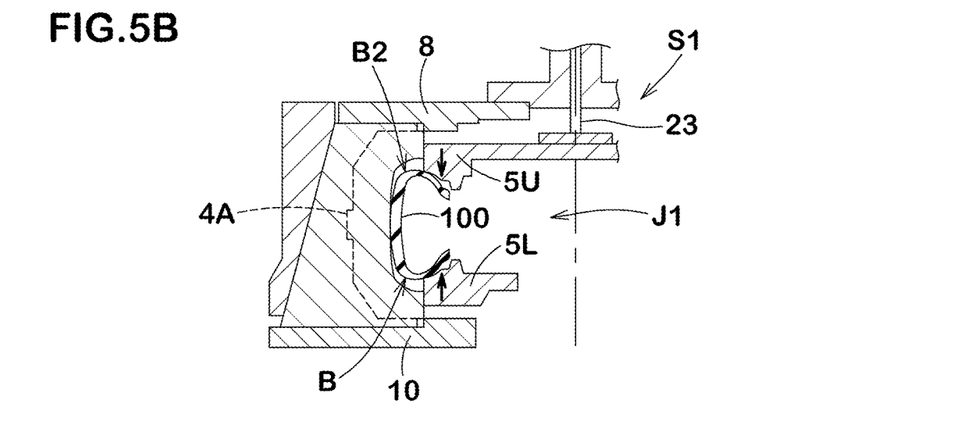
FIG. 5B A conceptional diagram showing the tire removal process.
Figure 5C:
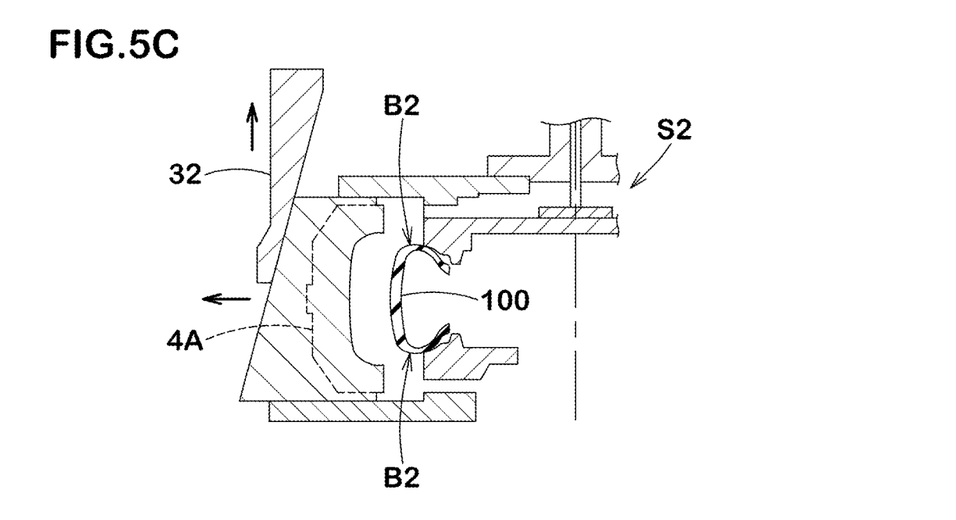
FIG. 5C A conceptional diagram showing the tire removal process.

As conceptionally shown in FIGS. 5A, 5B, and 5C, the tire removal step includes a first stage (S1) (shown in FIG. 5B) and a second stage (S2) (shown in FIG. 5C). It should be noted that FIG. 5A shows a state in which the mold 2 is in a closed state (J1) and the tire 100 is vulcanized therein.

Figure 4:
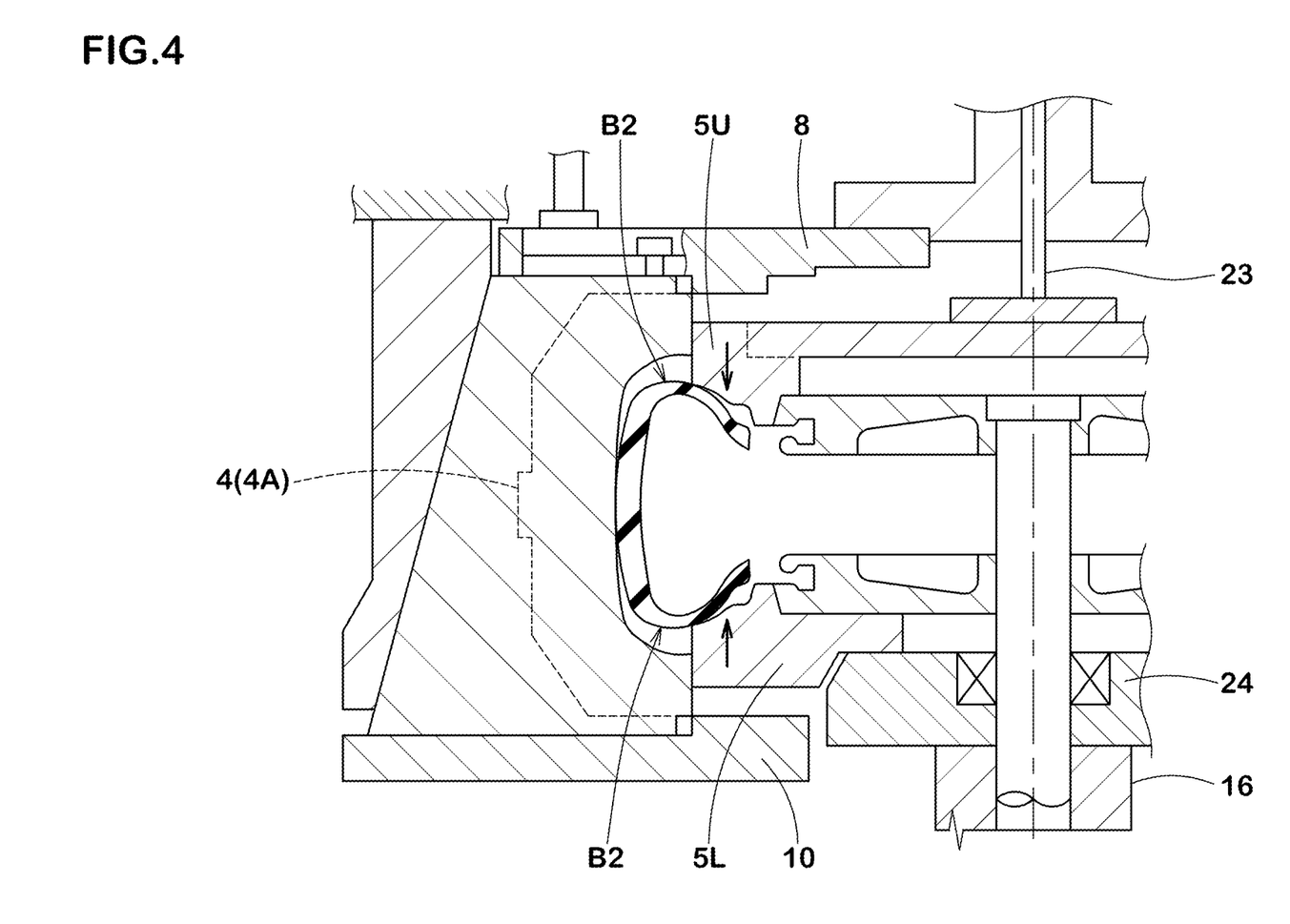
FIG. 4 A cross-sectional view showing, together with a vulcanized tire, a state in which an upper side mold and a lower side mold are moved inward in a tire axial direction.

As shown in FIGS. 4 and 5B, in the first stage (S1), after the vulcanization, each of the upper and the lower side molds (5U) and (5L) is moved inwardly in the tire axial direction. Thereby, the vulcanized tire 100 is deformed in a direction in which a bead width is decreased, therefore, the side blocks (B2) of the tire can escape from the segments (4A) inwardly in the tire axial direction.

In the present example, the first stage (S1) is performed by lowering the upper side mold (5U) relative to the upper plate 8 by using the first lifting and lowering device 9, and by lifting the lower side mold (5L) relative to the lower plate 10 by using the second lifting and lowering device 11.

Here, in the closed state (J1) of the mold 2, between segments (4A) and (4A), and between segments (4A) and the upper and the lower side molds (5U) and (5L) are strongly pressed against each other. Therefore, when the first stage (S1) is suddenly performed from the closed state (J1), it is possible that the upper and the lower side molds (5U) and (5L) and the segments (4A) are strongly rubbed against each other, thereby, it is possible that damage is caused on both sides.

Therefore, it is preferred that, prior to the first stage (S1), an initial stage (not shown) is further included in which each of the segments (4A) is moved radially outwardly from the closed state (J1) of the mold 2 so as to separate the tread mold 4 from the upper and the lower side molds (5U) and (5L). If this separation distance is too large, it is possible that the segments (4A) get caught on the side blocks, therefore, rubber chipping may occur. Thereby, it is preferred that the separation distance is 2.0 mm or less.

As shown in FIG. 5C, in the second stage (S2), in the deformed state of the tire 100, each of the segments (4A) is moved radially outwardly so that the segments (4A) are removed from the tire 100. In this way, by putting the side blocks (B2) in a state in which they are escaped axially inwardly, the segments (4A) can be pulled out radially outwardly without getting caught on the side blocks (B2). That is, the tire 100 can be easily removed from the mold 2 without causing a damage such as block chipping to the tire 100.

It should be noted that the second stage (S2) is performed by lifting the actuator 32 relative to the upper plate 8 by the fifth lifting and lowering device 33 while maintaining the first stage (S1).

After the second stage (S2), as shown in FIG. 6, the upper plate 8 is lifted together with the actuator 32 to the position in the standby state (PU). Thereby, the mold 2 is in an open state (J2), therefore, the tire 100 can be removed from the mold 2.

It should be noted that one of the upper and the lower bases (12U) and (12L) can also be configured to be vertically movable in order to secure a stroke for removing the tire 100 from the mold 2. Further, as the first to fifth lifting and lowering devices 9, 11, 17, 20, and 33, various well-known components other than the cylinder can be used.

It should be noted that the tire vulcanizing apparatus 1 is provided with a control unit (not shown) for the apparatus 1 to perform the initial stage, the first stage (S1), and the second stage (S2) sequentially. The control unit is, for example, a computer or the like, and includes a control portion that controls on and off of the first to fifth lifting and lowering devices 9, 11, 17, 20, and 33.

As shown in FIG. 1, it is preferred that the tire vulcanizing apparatus 1 of the present example is provided with a first detecting unit 37 and a second detecting unit 38. As the first and the second detecting units 37 and 38, so-called linear scales can be suitably used.

The first detecting unit 37 detects a relative moving distance in the tire axial direction of the upper side mold (5U) with respect to the upper plate 8. The first detecting unit 37 of the present example includes a pointer fixed to, for example, the rod of the first lifting and lowering device 9, and a scale portion fixed to, for example, a stay. The second detecting unit 38 detects a relative moving distance in the tire axial direction of the lower side mold (5L) with respect to the lower plate 10. The second detecting unit 38 of the present example includes a pointer fixed, for example, to the rod of the second lifting and lowering device 11 or to the lifting and lowering plate 15, and a scale portion fixed, for example, to a stay.

It should be noted that various well-known measuring instruments or sensors may be used as the first and the second detecting units 37 and 38.

While detailed description has been made of especially preferred embodiments of the present invention, the present invention can be embodied in various forms without being limited to the illustrated embodiments.

DESCRIPTION OF REFERENCE SIGNS 1 tire vulcanizing apparatus
2 mold
4 tread mold
4A segment
5L lower side mold
5U upper side mold
8 upper plate
9 first lifting and lowering device
lower plate
11 second lifting and lowering device
100 tire
BL bead base line
H tire section height
J1 closed state
J2 open state
m tire maximum width position
Q split position
S1 stage
S2 stage

The invention claimed is:
1. A tire vulcanizing method for vulcanizing a green tire by a mold including a tread mold comprising a plurality of segments arranged in a tire circumferential direction and upper and lower side molds, including a tire removal step of removing the vulcanized tire from the mold after vulcanization, wherein
    the tire removal step includes
    a stage in which each of the upper and the lower side molds is moved inward in a tire axial direction so as to deform the vulcanized tire in a direction in which a bead width of the vulcanized tire is decreased, and
    a stage in which, in the deformed state of the vulcanized tire, each of the segments is moved outward in a tire radial direction such that the segments are removed from the vulcanized tire.
2. The tire vulcanizing method according to claim 1, wherein
    a distance in the tire radial direction between a bead base line and a split position between the tread mold and the upper and the lower molds is smaller than ½ of a tire section height.
3. The tire vulcanizing method according to claim 1, wherein
    a split position between the tread mold and the upper and the lower molds is positioned radially inside a tire maximum width position.
4. The tire vulcanizing method according to claim 1, wherein
    the tire removal step further includes a stage in which each of the segments is moved outward in the tire radial direction from a closed state of the mold so as to separate the tread mold from the side molds.
5. The tire vulcanizing method according to claim 4, wherein
    the stage in which each of the segments is moved outward in the tire radial direction from the closed state of the mold so as to separate the tread mold from the side molds is performed prior to the stage in which each of the upper and the lower side molds is moved inward in the tire axial direction so as to deform the vulcanized tire in the direction in which the bead width of the vulcanized tire is decreased.

6. The tire vulcanizing method according to claim 4, wherein
a separation distance of the tread mold from the side molds is 2.0 mm or less.

7. The tire vulcanizing method according to claim 1, wherein
the tread mold has a molding surface for forming side blocks on a sidewall portion of the vulcanized tire, and
a split position between the tread mold and the upper and the lower molds is positioned radially inside innermost ends in the tire radial direction of the side blocks.

8. A tire vulcanizing apparatus used for the tire vulcanizing method according to claim 1, including a control unit configured to perform
the stage in which each of the upper and the lower side molds is moved inward in the tire axial direction so as to deform the vulcanized tire in the direction in which the bead width is decreased, and
the stage in which, in the deformed state of the vulcanized tire, each of the segments is moved outward in the tire radial direction so as to be removed from the vulcanized tire.

9. The tire vulcanizing apparatus according to claim 8, including
an upper plate for supporting the segments, and
a first lifting and lowering device capable of moving the upper side mold inward in the tire axial direction with respect to the upper plate.

10. The tire vulcanizing apparatus according to claim 9, further including
a first detecting unit which detects a moving distance in the tire axial direction of the upper side mold with respect to the upper plate.

11. The tire vulcanizing apparatus according to claim 9, wherein the first lifting and lowering device is a cylinder.

12. The tire vulcanizing apparatus according to claim 8, including
a lower plate for placing the lower side mold, and
a second lifting and lowering device capable of moving the lower side mold inward in the tire axial direction with respect to the lower plate.

13. The tire vulcanizing apparatus according to claim 12, further including
a second detecting unit which detects a moving distance in the tire axial direction of the lower side mold with respect to the lower plate.

14. The tire vulcanizing apparatus according to claim 12, wherein the second lifting and lowering device is a cylinder.

15. The tire vulcanizing apparatus according to claim 8, wherein
a distance in the tire radial direction between a bead base line and a split position between the tread mold and the upper and the lower molds is smaller than ½ of a tire section height.

16. The tire vulcanizing apparatus according to claim 8, wherein
a split position between the tread mold and the upper and the lower molds is positioned radially inside a tire maximum width position.

17. The tire vulcanizing apparatus according to claim 8, wherein
the tread mold has a molding surface for forming side blocks on a sidewall portion of the vulcanized tire, and
a split position between the tread mold and the upper and the lower molds is positioned radially inside innermost ends in the tire radial direction of the side blocks.

18. The tire vulcanizing apparatus according to claim 8, including a diameter expanding and contracting unit for expanding and contracting a diameter of the tread mold.

19. The tire vulcanizing apparatus according to claim 8, wherein
the control unit is configured to perform a stage in which each of the segments is moved outward in the tire radial direction from a closed state of the mold so as to separate the tread mold from the side molds is performed prior to the stage in which each of the upper and the lower side molds is moved inward in the tire axial direction so as to deform the vulcanized tire in the direction in which the bead width of the vulcanized tire is decreased.

20. The tire vulcanizing apparatus according to claim 19, wherein
a separation distance of the tread mold from the side molds is 2.0 mm or less.

* * * * *